United States Patent [19]

Chambers

[11] 4,168,229

[45] Sep. 18, 1979

[54] REMOVAL OF OIL FROM AN OIL IN WATER EMULSION

[75] Inventor: David B. Chambers, Cheadle, England

[73] Assignee: Imperial Chemical Industries Limited, London, England

[21] Appl. No.: 862,172

[22] Filed: Dec. 19, 1977

Related U.S. Application Data

[63] Continuation of Ser. No. 620,048, Oct. 6, 1975, abandoned.

[30] Foreign Application Priority Data

Oct. 14, 1974 [GB] United Kingdom ............... 44395/74

[51] Int. Cl.$^2$ ............................................. B01D 13/00
[52] U.S. Cl. .................................... 210/23 R; 210/40; 210/DIG. 5; 210/DIG. 26
[58] Field of Search .......... 210/23 R, 36, 40, 242 AS, 210/502, 504, 505, 508, 509, DIG. 5, DIG. 26; 428/372-374, 378

[56] References Cited

U.S. PATENT DOCUMENTS

| | | | |
|---|---|---|---|
| 2,464,204 | 3/1949 | Baker | 210/DIG. 26 |
| 3,142,612 | 7/1964 | Reiman | 210/509 |
| 3,234,075 | 2/1966 | Braitberg | 210/64 |
| 3,256,997 | 6/1966 | Pall et al. | 208/187 |
| 3,268,442 | 8/1966 | Pall et al. | 210/23 R |
| 3,484,371 | 12/1969 | Biegler | 210/DIG. 26 |
| 3,689,407 | 9/1972 | Rhodes | 210/23 R |
| 3,794,583 | 2/1974 | Rhodes | 210/DIG. 26 |
| 3,800,945 | 4/1974 | Fowler | 210/505 |
| 3,810,832 | 5/1974 | Rhodes | 210/DIG. 5 |
| 3,974,072 | 8/1974 | Birchall | 210/167 |

FOREIGN PATENT DOCUMENTS

| | | |
|---|---|---|
| 1517952 | 6/1970 | Fed. Rep. of Germany . |
| 1786218 | 10/1971 | Fed. Rep. of Germany . |
| 2452387 | 5/1975 | Fed. Rep. of Germany . |
| 655891 | 12/1928 | France . |
| 2249698 | 11/1974 | France . |
| 6510271 | 2/1967 | Netherlands . |
| 7414429 | 11/1972 | Netherlands . |
| 360197 | 7/1974 | United Kingdom ..................... 210/508 |

OTHER PUBLICATIONS

Surface Chemistry, Osipow, 1962, Reinhold, U.S.A., 81, 82, 302-305, 316-323.

*Primary Examiner*—Charles N. Hart
*Assistant Examiner*—Ernest G. Therkorn
*Attorney, Agent, or Firm*—Cushman, Darby & Cushman

[57] ABSTRACT

A method for the removal of oil from an oil in water emulsion by contacting the emulsion with a fibrous structure and removing the coalesced oil droplets so formed the improvement being that the fibrous structure comprises inorganic fibers which, in the emulsion, have a positive zeta potential.

4 Claims, No Drawings

REMOVAL OF OIL FROM AN OIL IN WATER EMULSION

This is a continuation of application Ser. No. 620,048 filed Oct. 6, 1975, now abandoned.

The present invention concerns the removal of oil from an oil in water emulsion.

It is known that described methods for removing oil from mixtures of oil and water. In particular we have described how emulsified oil droplets can be caused to coalesce by passing an oil in water emulsion through a fibrous structure comprising fibres having particles on their surface which exhibit oleophilic and hydrophobic properties. The oil droplets coalesce into much larger droplets which can be removed by gravimetric separation i.e. flotation of the oil from the emulsion in a chamber located downstream of the fibrous structure.

Whilst the fibrous structures mentioned above have been found to be particularly successful in achieving coalescence of unstable primary emulsions which are characterised by an oil droplet size of the order of 100 microns, it has not been as successful in achieving coalescence of secondary emulsions consisting of oil droplets of submicron size.

According to the present invention we provide a method for the removal of oil from an oil in water emulsion which comprises contacting the emulsion with a fibrous structure comprising inorganic fibres which, in the emulsion, have a positive zeta potential, and removing the coalesced oil droplets so formed.

It is thought that the oil droplets being negatively charged, are attracted to the surface of the individual inorganic fibres in the fibrous structure and coalesce forming larger droplets which detach themselves from the fibrous structure. The larger droplets so formed can then conveniently be separated from the oil/water emulsion by allowing the droplets to float to the surface to form a layer of oil which can be removed.

Though, in the method of the invention, the emulsion may merely contact the surface of the fibrous structure, as would be the case if the emulsions were passed over the surface of the fibrous structure, as, for example, when the fibrous structure constitutes one or more surfaces of a parallel plate separator, we prefer, in order to produce effective coalescence of the oil, to pass the emulsion through the fibrous structure.

Though the fibrous structure may comprise any inorganic fibres which acquire a positive zeta potential when immersed in the particular oil in water emulsion, particularly suitable fibres are those made from asbestos, alumina and zirconia.

When immersed in oil/water emulsions at various pH values, alumina fibres acquire a zeta potential in the range 50 millivolts (at pH 4) to 30 millivolts (at pH 7) to 0 millivolts (at pH 8.5). Similarly zirconia fibres acquire a zeta potential in the range 60 millivolts (at pH 4) to 20 millivolts (at pH 7) to 0 millivolts (at pH 7.7). Asbestos fibres acquire a zeta potential in the range 35 millivolts (at pH 4) to 35 millivolts (at pH 7) to 20 millivolts (at pH 10).

It will be realised, therefore, that fibrous structures composed of alumina fibres are most useful in those emulsions having a pH less than 8.5 (and zirconia fibres are most useful in those emulsions having a pH less than 7.7). In contrast asbestos fibres can be used irrespective of the pH of the emulsion.

Nevertheless, as it is usual for the pH of the emulsion to be approximately 7, we prefer to use those alumina fibres and zirconia fibres sold by Imperial Chemical Industries Limited under the Trade Mark 'Saffil' because 'Saffil' fibres are microporous and so have a particularly large surface area which is itself conducive to the coalescence of oil droplets within the emulsion. They can be produced with surface area as measured by BET/nitrogen adsorption within the range 100 to 150 $m^2/g$ (alumina) and 5–15 $m^2/g$ (zirconia). In contrast the surface area calculated for a smooth fibre such as glass of diameter 3 microns is only 0.48 $m^2/g$.

In general, the average diameter and diameter distribution of the fibres are important in providing desired bulk properties in the fibre mass. Fine fibre diameters and relatively narrow diameter distributions are preferred. An average fibre diameter of 0.5 to 5 microns is especially preferred; a diameter distribution which ensures that the fibre mass contains not greater than 30% by number of fibres of greater diameter than 5 microns, for example not greater than 20% by number of fibres of greater diameter than 5 microns is also especially preferred. Relative freedom from shot, that is the substantial absence, for example less than 1% by weight, of material of a non-fibrous nature is a desirable property of fibres for use in the invention, as the presence of shot tends to reduce the uniformity of flow of fluid through the fibrous mass. Fibres of alumina or zirconia prepared as disclosed in United Kingdom Patent Specification No. 1360197 are especially useful as they have the desired properties.

The fibrous structure used in the method of the invention may be a woven or non-woven fabric formed from the inorganic fibres. Alternatively the fibrous structure may be loosely packed chopped fibres in which case it may be necessary to retain the fibrous structure between open-weave or open-mesh sheets.

Included in this fibrous structure may be other fibres such as inorganic fibres, for example calcium or aluminium silicate fibres, and vitreous aluminosilicate fibres; natural fibres such as cotton or rayon; synthetic fibres such as fibres of a polyolefine or a polyester.

The opposed faces of the fibrous structure are usually substantially flat and in this case the fibrous structure usually comprises a wall of a chamber which contains the emulsion to be treated. If a difference in pressure head is maintained across the fibrous structure then the emulsion will flow continuously through the fibrous structure. Alternatively the fibrous structure may be moulded to some shape such as a tube. A particularly desirable shape is a tube which is closed at one end, i.e. resembling a large test-tube, in which case the emulsion can be passed into the closed tube and if a suitable difference in pressure head maintained across the fibrous structure, the emulsion passes continuously through the walls of the tube and coalescence of the oil droplet particles occurs.

It is understood that the fibrous structures described herein are particularly useful in treating secondary emulsions and so, if the mixture to be treated contains both primary and secondary emulsions then the mixture can be effectively treated in a number of stages viz (1) contacting the mixture of primary and secondary emulsions with an oleophilic and hydrophobic fibrous structure whence coalescence of the primary emulsion occurs, (2) allowing the coalesced oil particles to float to the surface of the mixture to form a layer of oil and removing this, (3) contacting the essentially secondary emulsion with a fibrous structure comprising inorganic fibres which, when immersed in the emulsion, acquire a positive zeta potential, and (4) allowing the coalesced oil particles to float to the surface of the water to form a layer of oil and removing this. In certain cases, however, it might be necessary to repeat stages (1) and (2) before stage (3) is carried out. Furthermore it may be desirable to repeat stages (3) and (4) in order to reduce the oil concentration to an acceptable level. Also in stages (1) and (3) it is preferred that the emulsion is passed through the fibrous structure.

In certain cases the oil droplets may not coalesce to a sufficiently large size for them to separate, by flotation, from the emulsion. Under these circumstances it may be necessary to provide one or more other coalescers downstream of the inorganic fibrous structure in order to achieve a satisfactory separation of oil from the emulsion. Though these other coalescers may be spaced from the inorganic fibrous structure we prefer to merely form a lay-up by superimposing a sheet of the inorganic fibrous structure on one or more sheets having a fibrous structure comprising fibres having particles on their surface which exhibit olephilic and hydrophobic properties. A suitable arrangement is a three component lay-up comprising an inorganic fibrous structure followed by an area-bonded melded fabric followed by a point-bonded melded fabric, the latter two fabrics having a fibrous structure comprising fibres having particles on their surface which exhibit oleophilic and hydrophobic properties.

The invention will now be described with reference to the following Examples:

EXAMPLE 1

An area-bonded, melded fabric of 137 gm. per square meter, produced from staple fibres of oriented, i.e. drawn, sheath/core heterofilaments in which the core (50% by weight of total weight of filament) was polyethylene terephthalate of melting point 257° C. and the sheath was a copolymer of polyethylene terephthalate and polyethylene adipate (85:15 mole ratio) of melting point 220° C., was passed through a 2% dispersion of silane-coated silica particles (Silanox 101 manufactured by Cabot Corporation; primary particle size 7 millimicrons; BET surface area 225 m$^2$/gm) in trichloroethylene. The dried fabric was held at constant area on a pin stenter frame while being heated at 217° C. for ten minutes, and finally rinsed with water to remove lossely adhering particles. Drops of water placed on the dried fabric had a mean contact angle of 155°.

With a typical mineral oil in water emulsion having an oil concentration of 684 ppm and pH 7, the oil concentration can be reduced to 43 ppm by a single pass through a coalescer produced by forming a two component lay-up by superimposing two pieces of the treated fabric. Further passes through a similar coalescer only serve to reduce the oil concentration in the liquid phase by a small proportion indicating that the emulsion is effectively a secondary emulsion.

If, however, the secondary emulsion of pH 7 is passed through a fibrous structure comprising chopped zirconia fibres ('Saffil') of mean diameter 3 microns sandwiched between open-mesh 'Netlon' sheets further coalescence occurs and, after allowing 5 minutes settlement during which coalesced oil droplets float to the surface and form a layer of oil which can be easily removed, the oil concentration in the liquid phase is reduced to 21 ppm at flows of 8m$^3$ per hour per square meter of fabric.

EXAMPLE 2

A point-bonded, melded fabric of similar construction to that described in Example 1 was treated in a similar manner to that described in Example 1.

Even though in Example 1 the use of a fibrous structure comprising chopped zirconia fibres served to reduce the oil concentration in the secondary emulsion by a considerable amount nevertheless it was apparent that a large number of the coalesced oil droplets were of insufficient size for them to float to the surface of the emulsion stream.

In the present Example, Example 1 was repeated in entirety except that the secondary emulsion had a concentration of 5 ppm, the hydraulic flow was greater than 10m$^3$ per hour per square meter of fabric and the chopped zirconia fibrous structure was replaced by a fibrous structure comprising a lay-up of three superimposed sheets consisting of a chopped alumina fibre fibrous structure ('Saffil' of mean diameter 3 microns sandwiched between open-mesh 'Netlon' sheets) followed by a treated area-bonded melded fabric (as in Example 1) followed by a treated point-bonded melded fabric (described above in this Example).

In this case considerable coalescence of oil droplets occured and they were of sufficient size to float to the surface of the emulsion to form a layer which could be removed by a floating take-off arm. The concentration of the oil in the residual emulsion was now only 0.2 ppm after allowing settlement for 6 minutes.

EXAMPLE 3

Example 2 was repeated in entirety except that the secondary oil emulsion had a concentration of 9 ppm and the hydraulic flow was 9.2m$^3$ per hour per square meter of fabric. The concentration in the residual oil was 3 ppm after allowing settlement for 6 minutes.

EXAMPLE 4

Used motor car oil (Duckhams 30/50 at 3,500 miles) was dispersed in tap water (pH=7) using a high speed mixer to form an oil in water emulsion. The emulsion, after settling, contained 1051 ppm of oil and was stable for several hours as assessed by turbidity.

About 50 mls of the emulsion was passed through a pad of loosely chopped fibres held between the flanges of a pair of flanged glass tubes using rubber packing pieces to prevent end compression and edge leakage.

The time taken for the emulsion to fill a 10ml measuring cylinder provided the flow rate through the fibrous pad. A sample was taken and the turbidity measured immediately on a colorimeter which had previously been calibrated against the emulsion, at various dilutions covering the range 100% to 0.01%. The oil content of the emulsion was obtained by progressively extracting the oil with 60–80% petroleum ether, combining the extracts and evaporating at 100° C.

Comparative tests were carried out with fibrous pads made from glass fibre (Owens-Corning FM 004), which has a negative zeta potential, and alumina fibres (Saffil), which have a positive zeta potential when immersed in the oil in water dispersion (pH=7). The individual glass fibres and alumina fibres used in the fibrous pads had similar, but not identical diameters.

The results obtained are set out in the following table:

| Fibre | Weight of Sample (grams) | Flow Rate m³/hr/m² | Oil in Water Before ppm | Oil in Water After ppm | Removal of Oil % |
|---|---|---|---|---|---|
| Glass | 0.183 | 7.2 | 860 | 360 | 58.3 |
|  | 0.4104 | 7.2 | 860 | 247 | 71.4 |
|  | 0.6054 | 6.0 | 860 | 215 | 75.1 |
| Alumina | 0.2652 | 10.3 | 860 | 265 | 69.4 |
|  | 0.5392 | 7.2 | 860 | 196 | 77.2 |
|  | 1.4342 | 7.2 | 860 | 25 | 97.2 |

From the results it was apparent that alumina provided a very high removal of oil, down to 25 ppm at 6m³/hr/m². In contrast, glass fibre, which has a negative zeta potential, reduced the oil level to only 170 ppm even at a much lower flow rate of 3m³/hr/m².

EXAMPLE 5

An oil/water emulsion at a given pH was passed through a fibrous structure comprising chopped alumina fibres (Saffil) of mean diameter 3 microns sandwiched between two layers of an area bonded melded fabric (as described in Example 1). Coalescence of the oil droplets occurred. After allowing 5 minutes for settlement, the coalesced oil droplets floated to the surface and were skimmed from the surface. The hydraulic flow through the fabric was 10m³/hr/m² fabric cross sectional area. The pH of the emulsion was varied in the range 2.5 to 10 and the following results were obtained:

| pH | inlet oil concentration ppm | outlet oil concentration ppm |
|---|---|---|
| 2.5 | 1586 | 2 |
| 7.0 | 3098 | 34 |
| 7.0 | 2203 | 116 |
| 10.0 | 1290 | 110 |

The results indicate that alumina fibres are less effective as an oil coalescer in alkaline solutions i.e. when the fibrous surface no longer exhibits a positive zeta potential.

I Claim:

1. A method for the removal of oil from an oil in water emulsion comprising contacting the emulsion with a fibrous structure comprising fibers having particles on their surface which exhibit oleophilic and hydrophobic properties; allowing the coalesced oil particles to float to the surface of the mixture to form a layer of oil and removing this; contacting the essentially secondary emulsion so formed and characterized by oil droplets of submicron size with a fibrous structure comprising alumina or zirconia fibers which, when immersed in the emulsion, acquire a positive zeta potential; allowing the coalesced oil particles to float to the surface of the water to form a layer of oil and removing this.

2. A method for the removal of oil from a secondary emulsion of oil in water consisting essentially of oil droplets of submicron size in water, which comprises contacting the emulsion with a fibrous structure so that the oil droplets coalesce, allowing the coalesced droplets to float to the surface to form a layer of oil and removing said oil layer, the fibrous structure comprising fibers of alumina or zirconia which have an average diameter in the range of 0.5 to 5 microns and which, in the emulsion, have a positive zeta potential.

3. A method as claimed in claim 2 in which the distribution of the fibre diameters is such that the fibrous structure contains not greater than 30% by number of fibres of greater diameter than 5 microns.

4. A method as claimed in claim 3 in which the distribution of fibre diameters is such that the fibrous structure contains not greater than 20% by number of fibres of greater diameter than 5 microns.

* * * * *